United States Patent [19]
Kotthoff

[11] 3,922,355
[45] Nov. 25, 1975

[54] METHOD OF PREPARING COLORED MAMMARY GLAND TISSUE

[75] Inventor: Lindsay Lawrence Kotthoff, Lavington, Australia

[73] Assignee: Uncle Ben's of Australia Pty. Ltd., Wodonga, Australia

[22] Filed: Aug. 20, 1973

[21] Appl. No.: 389,720

[30] Foreign Application Priority Data
Aug. 23, 1972 Australia............................. 187/72

[52] U.S. Cl................................ 426/250; 426/281
[51] Int. Cl.$^2$........................................... A23L 1/31
[58] Field of Search ........... 426/177, 250, 264, 265, 426/266, 281, 58

[56] References Cited
UNITED STATES PATENTS

| | | | |
|---|---|---|---|
| 3,139,346 | 6/1964 | Meusel et al. | 426/250 X |
| 3,216,826 | 11/1965 | Wattenbarger | 426/58 |
| 3,573,063 | 3/1971 | Williams | 426/58 |

OTHER PUBLICATIONS

Turner, "The Comparative Anatomy of the Mammary Glands," 1939, University Cooperative Store, Columbia, Missouri, pg. 84 & illustrations.

American Meat Institute Foundation, "The Science of Meat and Meat Products," 1960, published by M. H. Freeman & Co., San Francisco, pg. 335.

"Chemical & Engineering News" Oct. 17, 1966, pg. 124.

Rose et al., "The Condensed Chemical Dictionary," 1966, published by Van Hosstland Reinhold Co., N.Y., pg. 378, article entitled *Erythrosine*.

*Primary Examiner*—Hyman Lord
*Attorney, Agent, or Firm*—Davis, Hoxie, Faithfull & Hapgood

[57] ABSTRACT

Mammary gland tissue is made acceptable for use in canned pet food by injecting an aqueous solution containing a colouring agent into said tissue. The injection technique succeeds in providing a substantially uniform distribution of the colouring agent throughout the tissue. Haemoglobin, in the form of whole blood or a blood fraction can be used as the colouring agent.

7 Claims, No Drawings

METHOD OF PREPARING COLORED MAMMARY GLAND TISSUE

The present invention relates to the treatment of meat products and in particular to the treatment of such products to render them suitable for use as food for animals, for example domestic pets.

The mammary gland or udder of a lactating mammal such as the cow is an organ weighing from 10 to 25 pounds. The tissue of this gland is yellow or cream in colour. Although the texture of this tissue is acceptable for use in canned pet food, its colour, or lack of it, restricts its widespread use. As a result, the use of mammary gland or udder has to date been mainly directed to the production of tallow and meat meal and only small amounts have been used in the production of pet food in admixture with other red meats which provide the desired colour for the pet food.

In preparing the mammary gland or udder at the abattoirs for pet food, it must first be trimmed to remove the skin, hair, teats and fat before being washed and packed into cartons.

The return to the abattoirs from the sale of the trimmed material for pet food is relatively low, a large proportion of the price at which it is sold being taken up in labour, packaging, storage and administrative costs. Thus, if there was an inexpensive and simple method which could be used at the abattoirs during or after the normal trimming operation to colour the mammary gland tissue in such a way as to render it acceptable for increased use in the manufacture of pet food, the abattoir could obtain greater return for its product whilst still making it available to the pet food manufacturer at a cost comparable to the price of other meats used in prepared pet food.

It is a primary object of the present invention to provide a method for artificially colouring mammary gland tissue to give it an acceptable pink or red colour similar to that of other meats used in pet food. A further object is to provide such a method which is inexpensive, so as to keep the cost of the treated tissue to a minimum, and which may be simply operated during or after the normal trimming of the gland.

According to the present invention there is provided a method of treating mammary gland tissue which comprises injecting an aqueous solution containing a colouring agent into the said tissue to obtain substantially uniform dispersion of the solution throughout the tissue.

Preferably, a source of haemoglobin is used in the solution to be injected, and whole blood or blood fractions are particularly suitable since these materials will usually be readily available in economic quantities if the method of the invention is carried out at the abattoirs. Where a dye is used in the solution to be injected, any suitable pink- or red- coloured dye may be used. By way of example, it has been found that 0.1% w/w solution of erythrosine may be injected to provide a satisfactorily coloured tissue. Dyes of other colours may also be used, either singly or in combination to produce the desired colour. A further alternative is the use of caramel or other natural food colourings, as the colouring agent in the solution.

In a particularly preferred aspect of this invention there is provided a method of treating mammary gland tissue which comprises injecting an aqueous mixture containing blood and nitrite or nitrate ions into the said tissue to obtain substantially uniform distribution of the mixture throughout the tissue.

After treatment, it is preferred that the tissue is allowed to drain before further processing, which may consist of packing and freezing, the tissue then being delivered to the pet food manufacturer in the frozen condition. If desired after treatment, the tissue may be immersed in an aqueous solution of the colouring agent, for a period of time, to further ensure even distribution of colour throughout the tissue.

In the above described preferred aspect, the aqueous mixture which is injected into the tissue contains blood and a source of nitrite or nitrate ions, preferably sodium nitrite. The blood should not be coagulated and it is preferred that fresh blood containing a citrate or other anticoagulant be used. Coagulated blood may, however, be used provided the fibrinogen clots have been dispersed, for example by high speed cutting or vigorous agitation. Preferably, sodium nitrite is added to the mixture at a rate of about 200 parts per million. It is believed that pink coloured nitrosohaemochromogen is formed by reaction of the nitrite ions with haemoglobin in the blood under the reducing conditions present in the tissue and under the action of heat during subsequent processing, this nitrosohaemochromogen giving the treated tissue a more natural colour.

The use of nitrite or nitrate ions is not, however, essential where blood is used as the source of haemoglobin and the source of these ions may be omitted, particularly if the treated tissue is to be used in conjunction with other meats, for example in a canned product.

As previously described, the aqueous solution is injected into the tissue to obtain substantially uniform distribution throughout the tissue. Prior experimental work on the colouring of this type of tissue has shown that uniform distribution of colour throughout this tissue is not readily obtained. Thus efforts have been made to introduce colouring solutions under positive and negative pressures without significant success. In one such test, the mammary gland tissue was diced into approximately 15 mm. cubes and immersed in a 1% erythrosine dye solution at room temperature. The cubes were subjected either to vacuums of 29.5 inches or pressures of 60 p.s.i.g. for periods of up to half an hour. The penetration of the dye solution when using the vacuum method was slightly better than the penetration using the pressure method, however even using the vacuum method the penetration did not exceed about 3 mm. from the surface of the cubes.

According to the present invention, the aqueous solution is injected into the tissue and it has been found that by using this injection process, substantially uniform distribution of the solution may be obtained. Thus, treating the mammary gland as a whole after the normal trimming operation previously described, it has been found that by injecting at 1 inch intervals both laterally and transversely on each section such substantially uniform distribution may be obtained. Preferably, the injection of the solution is carried out at pressures in the vicinity of 125 p.s.i.g. and it has been found that by operating at such pressures, better colour and distribution is obtained than when operating at lower pressures such as 30 p.s.i.g.

The apparatus required for the operation of the method of the present invention may be quite simple and in fact normal meat curing equipment consisting of a normal curing gun containing a standard stitch needle may be used. Alternatively, more sophisticated automatic multi-needle pump apparatus may be used. As previously described, it is preferred that the process of this invention be carried out at pressures in the vicinity of 125 p.s.i.g. and if the standard meat curing equipment is not able to provide such pressures, a pressure booster may be used.

During injection of the solution, it has been found that the texture of the tissue softens considerably and the degree of penetration can be judged by the feel of the tissue texture. It has been found in practice that using the simple equipment described above, each gland can be treated quite quickly and only three to four minutes is required.

After treatment, the tissue is preferably allowed to drain for a period of, for example, one hour before being divided (if required) and packed into cartons for freezing. During this draining period the tissue has been found to lose about 20% of the solution previously injected into it and such losses must be taken into account when the final product is required to conform to certain limits, for example as to protein and/or fat content. Because of this need to drain the treated tissue, the injection of the aqueous solution is preferably carried out on a perforated pumping table to enable collection of the excess solution running from the tissue during treatment, with perforated draining racks also being provided to collect the solution lost during draining.

The concentration of haemoglobin or dye in the aqueous solution to be injected has been found to affect the colour of the treated product, and increasing concentrations may be used to give products of darker colour. As a result, the concentration may be selected depending on the eventual use of the product and the colour required. Preferably, where blood is used as the source of haemoglobin, the concentration of blood is within the range of 15 to 35% w/w, and a product with a colour similar to that of lung may be obtained using 15 to 20% w/w blood, whilst a product similar in colour to muscle meat may be obtained using 25 to 30% w/w blood. The concentration of blood in the solution may of course be varied outside the preferred range and concentrations between 10% and 100% can be used. To obtain a satisfactory product colour, whilst using a high concentration of blood in the injected solution, the total amount of solution injected should be reduced. As described above, however, it is preferred to use a blood concentration in the 15 to 35% range and inject a large amount of solution into the tissue, as this gives a more even colour distribution. The amount of solution injected into the tissue depends upon the pumping pressure applied and the design of the multi-needle pump apparatus, but is normally in the region of 10 – 40% of the weight of the tissue.

The solution may also include salt which increases the penetration into the tissue, and additions of up to, for example, 5% NaCl may be made. It has been shown that salts in certain solutions can increase the solubility of some meat proteins and the improved results on the addition of salt may be due to this. In addition, the osmotic effect of the salt may also aid penetration of the solution into the tissue.

The solution may also include polyphosphates which are known to increase the water binding properties of meats, or other binding aids such as sodium caseinate; or soluble forms of vegetable protein isolate, which have the added advantage of raising the protein content of the product.

Apart from the modification of the colour of the tissue it is possible within the scope of this invention to add flavours, or flavour enhancers and texturisers, or tenderisers, in order to further improve the acceptability of the product.

The temperature of the solution on injection into the tissue has been found to affect its penetration, and the penetration increases as the temperature is reduced, within reason. Thus, while satisfactory results may be obtained when the solution is at room temperature, preferably the solution is used at a temperature of about 32°F.

A particularly preferred mixture for use in the method of this invention is prepared by dissolving salt in iced water to obtain the desired temperature and then adding to that solution, sodium nitrite and blood. In different experiments, mixtures prepared by this process and containing 15, 25 and 35% w/w blood were injected into trimmed mammary gland tissue using the equipment and technique described above, to simulate various types of meat. After draining the glands were divided into sections and frozen. In all cases, a coverage of between 90 and 95% was achieved on examination of the frozen sample, and although there was a slight variation in colour throughout the tissue, in all cases this was considered compatible with normal meat. By completely thawing the tissue, an even better colour distribution was achieved giving a uniform colour identical to that of fresh meat.

Various draining times were examined with regard to the distribution of colour, however, it was found that very little variation in the colour distribution was made by holding the injected tissue for more than one hour before freezing. A greater effect was achieved during the thawing of the tissue as mentioned above.

In processing the tissue treated according to this invention, the tissue is preferably diced, for example into 40 mm. cubes, while frozen as the treatment causes the tissue to soften to an extent where it is difficult to cut after thawing. The tissue may then be subjected to the usual preparation procedures in addition to or in place of the normal meats used in canned or prepared pet foods.

The invention is illustrated in the following specific examples which are given by way of example only and not as limiting the invention.

EXAMPLE 1

Several trimmed and weighed cow udders were injected with a solution of 15 parts of blood in 85 parts of water. The temperature of the solution was 7°C. The solution was injected by hand using a conventional bacon curing stitch pump at 80 lb. per square inch pressure. Immediately after injection the glands were reweighed. The weight increase over the original weight was found to average 15.8%.

The glands were frozen and later cut open and examined. About 90% of the internal area of the tissue had been coloured showing a slightly greater concentration of colour near the areas where the blood had been injected. The glands were allowed to thaw and the thawed product showed an even colour distribution throughout and closely resembled animal lung in colour.

EXAMPLE 2

Several trimmed heifer udders were injected with an aqueous solution containing 0.1% erythrosine, 0.15% caramel and 2.0% sodium chloride. The solution was injected at a temperature of 11°C using a multi-needle pump at a pressure of 122 lb. per square inch. The average increase in weight after injection of the solution was 22%. The glands were allowed to drain for one hour, after which time the average increase in weight over the original weight was 17.1%.

The glands were frozen and later cut open and examined. About 95% of the internal area of the tissue had been coloured and the appearance of the product was similar to lean meat.

EXAMPLE 3

An aqueous solution at 0°C containing 25% blood, 2% sodium chloride, 2% tetra sodium pyrophosphate and 200 parts per million of sodium nitrite was injected into trimmed cow udders, using a multi-needle pump as in Example 2. The tissue was frozen after draining for one hour. Examination of the frozen product showed complete and even colour distribution throughout. The frozen product was diced, canned in gravy and processed under commercial canning conditions. The cooked product closely resembled lean muscle meat and had very good animal acceptance when fed to cats and dogs.

It will be appreciated that many variations or modifications may be made to the specific preferred features described above without departing from the broad teachings of this invention. Such variations or modifications are intended to be encompassed within the scope of this invention.

I claim:

1. A method of preparing a red or pink coloured meat product suitable for use as food for animals from yellow or creamed colored mammary gland tissue which comprises the steps of:
   injecting into said tissue an aqueous solution containing a red or pink colouring agent;
   and continuing said injection until substantially uniform dispersion of said solution throughout said tissue is achieved and the tissue has the appearance of red or pink meat.

2. A method as claimed in claim 1 wherein, after injection of said solution, said tissue is drained, frozen and then thawed to obtain more uniform dispersion of said solution.

3. A method as claimed in claim 1 wherein said tissue is immersed in said aqueous solution containing said colouring agent, subsequent to the injection treatment.

4. A method as claimed in claim 1 wherein the colouring agent is erythrosine which is present in said solution in an amount of about 1% w/w.

5. A method as claimed in claim 1 wherein said colouring agent comprises caramel.

6. A method as claimed in claim 1 wherein said colouring agent comprises a source of haemoglobin selected from whole blood and blood fractions and constitutes 15 to 35% w/w of said aqueous solution.

7. A method as claimed in claim 6 wherein said solution also contains ions selected from the group consisting of nitrite ions, nitrate ions, and mixtures thereof in quantity of about 200 ppm of solution.

* * * * *